Figure 1:
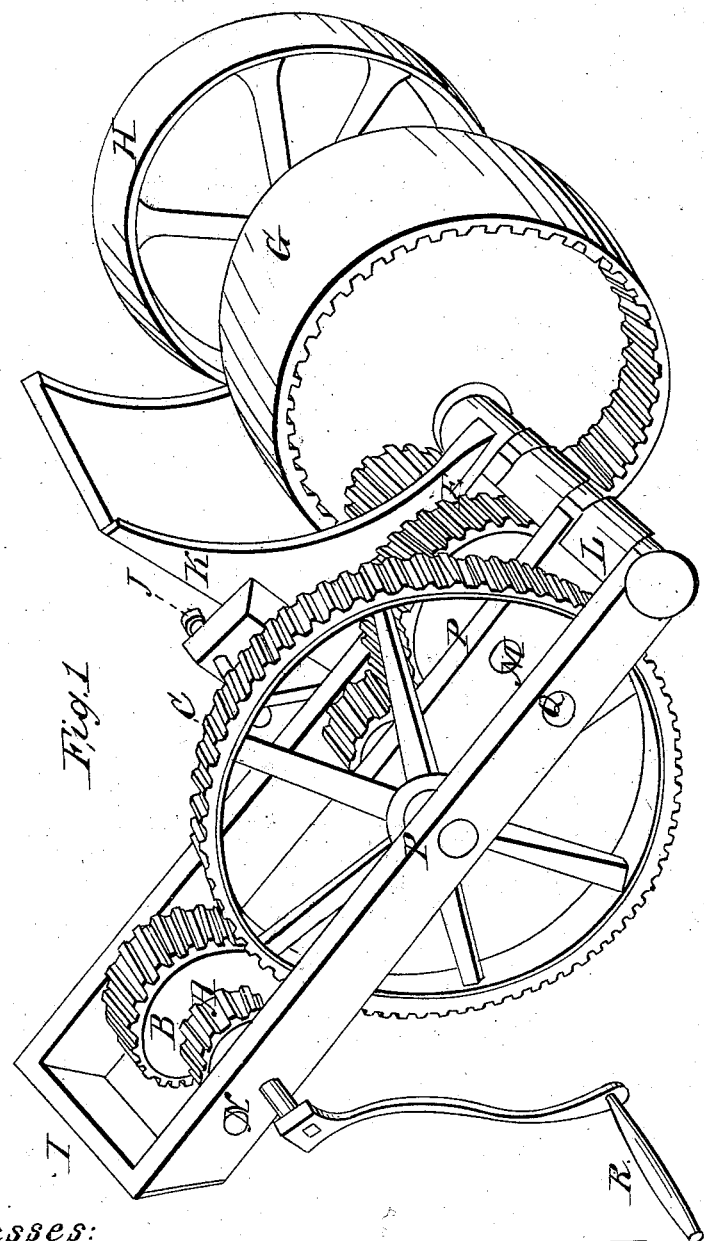

2 Sheets—Sheet 1.

T. W. PRATHER.
Truck for Moving Buildings.

No. 64,032.  Patented Apr. 23 1867.

Witnesses:
Isaac A Wetherby
Daniel H Crane

Inventor:
Thomas W. Prather

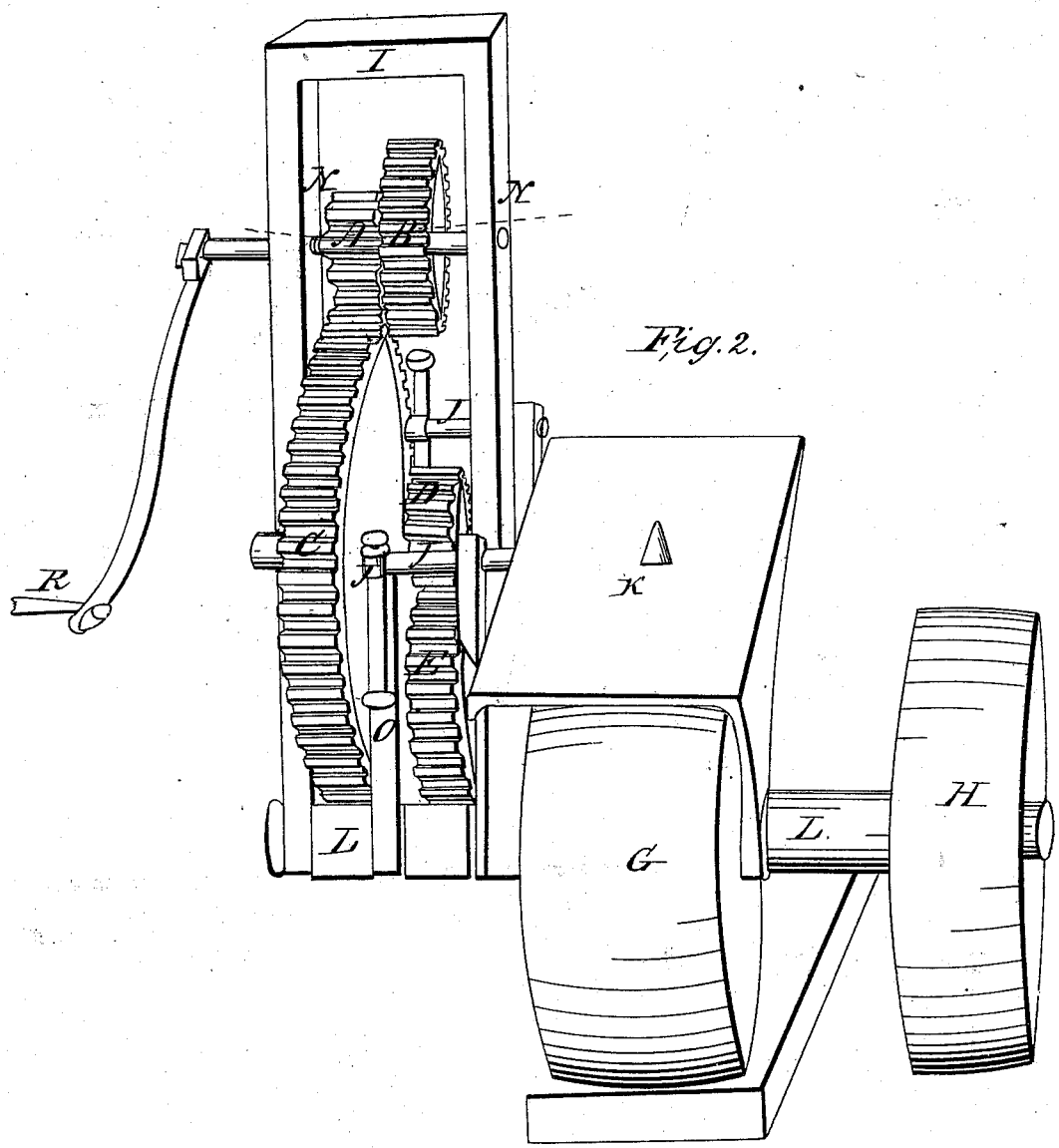

United States Patent Office.

THOMAS W. PRATHER, OF IOWA CITY, IOWA.

Letters Patent No. 64,032, dated April 23, 1867.

---

IMPROVED METHOD OF REMOVING BUILDINGS.

---

The Schedule referred to in these Letters Patent and making part of the same.

---

TO ALL WHOM IT MAY CONCERN:

Be it known that I, THOMAS W. PRATHER, of Iowa City, in the county of Johnson, and State of Iowa, have invented a new and valuable machine, to be known as Prather's Machine for Moving Buildings, for the purpose of moving frame buildings from one place to another; and I do hereby declare that the following is a full and exact description thereof, reference being had to the accompanying drawings and the letters of reference marked thereon, which are hereby made a part of this specification, in which—

Figure 1 is a perspective view; and

Figure 2, a longitudinal elevation of said machine.

My invention consists of a combination of cog-wheels working in connection with each other, with travelling and guard trucks and platform, to which screws are attached.

The cog-wheels marked A, C, D, E, and F, and truck G, work in connection with each other, the platform K and frame I being placed on axle L, and attached together by gudgeon M, as shown by fig. 1. The guard truck H is attached to the inner end of the axle L with a linch-pin, as shown in fig. 2. The sill of the building to be moved is placed on the pivot in the centre of platform K; and, by turning the crank R, sufficient power is applied, through said series of cog-wheels, arranged, connected, and co-operating as in said drawings represented, to move said truck G, and thereby said platform K, with the building resting thereon. In actual use it is intended that one of said machines shall be placed under each side of the building to be moved, near the front, with similar trucks G and H, and platform K, with screws J and J, under the rear end of the building. When thus used it is designed to move a heavy building. The screws J and J, connected by a shoulder with platform K, are designed to enable the operator to change the direction of the building, or turn the same round. Bar O, setting on axle L, is held in its proper place by the gudgeon through wheels C and D, and supports the outer end of gudgeon M. To unship frame I, and the cog-wheels in said frame, from the trucks G and H, and platform K, and also to detach said trucks from the platform, the gudgeon M is drawn out through the hole in the outer bar of frame I, marked Q. P and P are slot keys, to prevent the gudgeons from sliding out of place, one of which has a hook at one end to draw gudgeon M. The truck H is designed to be under the floor of the building, truck G moving on plank, as shown in fig. 2; and, in case truck G inclines to run out from under the building, truck H strikes the ground; or, should truck G incline to run under the building, truck H strikes the under side of the floor joists, and thus prevents the truck G from upsetting. Cog-wheel C is designed to be a spoke-wheel, as shown in fig. 1. The whole machine will be made of iron. It is designed that axle L shall be so constructed as to be worn on its four sides. When a lighter building, and one not requiring so much power, is to be moved, thus admitting of greater speed, cog-wheel B is to be placed in the position of cog-wheel A on crank-beam, or, rather, their positions on the crank-beam are to be changed, and the crank-beam is to be raised in frame I to N. When the building is still lighter, and less power is required, restore cog-wheels A and B to their original positions in the frame I, as shown in fig. 2, and also lower the crank-beam to its original position in the frame, and reverse the positions of cog-wheels D and E in said frame I, as now shown in said fig. 2; and for the lightest buildings, requiring still less power, allow cog-wheels D and E to remain in the reversed positions just stated, and again change the positions of cog-wheels A and B. By each of these changes greater speed may be obtained in the movement of the building, depending upon the weight thereof.

I claim the combination of the truck, wheels, crank, cog-wheels, shaft, platform, and screw, substantially as and for the purpose set forth.

THOMAS W. PRATHER.

Witnesses:
WILLIAM C. GASTON,
W. PENN CLARKE.